3,755,469
CONTINUOUS MANUFACTURE OF ACETYLENE ALCOHOLS

Heinrich Pasedach, Ludwigshafen, Walter Himmele, Waldorf, Ludwig Vogel, Frankenthal, and Klaus Weinerth, Ludwigshafen, Germany, assignors to Badische Anilin- & Soda-Fabrik Aktiengesellschaft, Ludwigshafen (Rhine), Germany
No Drawing. Filed July 10, 1969, Ser. No. 840,844
Claims priority, application Germany, July 10, 1968,
P 17 68 877.6
Int. Cl. C07c *33/04, 35/02*
U.S. Cl. 260—617 A          8 Claims

ABSTRACT OF THE DISCLOSURE

Continuous manufacture of acetylene alcohols by the ethynylation of aldehydes or ketones with at least 0.6 mole of a basic condensing agent per mole of aldehyde or ketone at 5 to 26 atm. gauge, the development of a gas phase in the reaction chamber being avoided.

---

The present invention relates to a method of continuously manufacturing acetylene alcohols by reacting acetylene with aldehydes or ketones, the formation of a cohesive gas phase being avoided.

From the commercial point of view, acetylene alcohols are important substances because they find application as soporifics, anti-corrosion agents and in particular as starting materials for the production of perfumes and vitamins A and E.

The reaction of acetylene with aldehydes or ketones has been described in numerous literature references, for example J. Org. Chem., 28, 1740–1743 (1963),
J. Org. Chem., 27, 279 (1962),
J. Org. Chem., 27, 1498–1504 (1962).

With the exception of the low molecular weight aldehydes formaldehyde and acetyl aldehyde, which can most economically be acetylenated by the method of W. Reppe using heavy metal acetylides as catalysts, it is basic condensing agents which are used for manufacture.

Under certain conditions, it is even possible to carry out the reaction using catalytic quantities of basic condensing agents.

Generally, anhydrous solvents of high solvency for acetylene are used. Ethynylation is promoted by using acetylene at elevated pressure.

In the processes described, however, the raction in all cases gives rise to an equilibrium condition so that the aldehydes or ketones which are used, alternatively referred to below as carbonyl compounds, are never fully reacted.

In some cases, in particular during the ethynylation of low molecular weight stable ketones, incomplete reaction is not too much of a drawback because the boiling points of the starting carbonyl compounds differ substantially from those of the corresponding acetylene alcohols and consequently the starting and end products can easily be separated by distillation.

However, this is not the case with the reaction mixture which is obtained by the ethynylation of carbonyl compounds of higher molecular weight, because the boiling points of acetylene alcohols which have 10 or more carbon atoms differ only little from those of the starting carbonyl compounds and separation by distillation is often out of the question.

High conversion efficiencies are achieved by a method which has been published in U.S. specification 2,973,390 and in Ind. Eng. Chem., Process Des. Develop., vol. 1, No. 2, April 1962, pages 137–141, where a description is given of how, when manufacturing ethynylhexanol and its homologs, high conversion efficiencies are obtained if the reaction is carried out under conditions which exclude a gas phase and at pressures above 68 atm. gauge, the acetylene being introduced not in the gaseous condition but in the form of a solution. As the said specification indicates, this method is not suitable for other acetylene alcohols. Moreover, it has the drawback that acetylene solutions have to be prepared and that very high pressures are needed.

Equally, however, in preparing the reaction mixture of low molecular weight ketones and aldehydes, losses of unreacted components are often unavoidable.

It has therefore been desirable to achieve more or less quantitative reaction of aldehydes or ketones with acetylene. However, this can only be achieved if it is not merely catalytic quantities of alkaline condensing agents which are used, but approximately equimolecular quantities.

Furthermore, it is necessary to maintain the highest possible acetylene concentrations in the reaction mixture in order to inhibit the formation of acetylene glycols by further reaction of the acetylene alcohols.

For reasons of safety, however, in the commercial manufacture of acetylene alcohols the acetylene concentration cannot be raised indefinitely.

We have now found that it is possible to continuously manufacture acetylene alcohols by reaction of ketones or aldehydes with acetylene in organic solvents in the presence of suspended basic condensing agents, and using acetylene at elevated pressure, if a suspension of the basic condensing agent in an organic solvent which is inert under the reaction conditions is injected into the reaction chamber under pressure while stirring, simultaneously and continuously with the ketone or aldehyde and pure gaseous acetylene, the intensity of such injection being such that a pressure in the range between 5 and 26 atm. gauge is maintained and the reaction mixture is continuously discharged so that no gas phase can develop in the reaction chamber, the basic condensing agent being employed in at least 0.6 times the molar quantity referred to that of the carbonyl compound.

The basic condensing agent is preferably used in a molar quantity of 0.9 to approximately 2.0 times that of the carbonyl compounds.

Organic solvents which are inert under the reaction conditions include, where acetylene reactions are concerned, conventional solvents which are resistant to the alkaline condensing agents used and which do not react with acetylene, the acetylene alcohols and the carbonyl compounds. Accordingly, aliphatic and aromatic hydrocarbons as well as their chlorination products such as hexane, heptane, octane, benzene, toluene or chlorobenzene are eligible. Furthermore, oxygen-bearing compounds containing no hydroxyl groups, such as ethers or acetals, e.g. diethyl ether, dipropyl ether, tetrahydrofuran, hexamethylene oxide, dioxane, methylal or dibutylacetal, are equally eligible.

Again, acid amides such as dimethylformamide, dimethylacetamide, N-methylpyrrolidone and other compounds having a high solvency for acetylene, such as dimethylsulfoxide, are suitable. These solvents are if possible used in an anhydrous condition and are so selected that the boiling point of the solvent is sufficiently well distinguished from that of the acetylene alcohol in order that easy separation of the reaction mixture is possible. Organic compounds such as alcohols or glycols, which contain hydroxyl groups, are unsuited as solvents in the present context. However, the addition of small quantities of these substances can improve the suspension of the alkaline compounds in solvents. For example, by adding a few percent (based on the solvent) of a low molecular weight alcohol, the sedimentation rate of the alkaline suspension can be slowed down.

The basic condensing agents which can be used include inorganic and organic bases, in particular alkali metal alcoholates, alkali metal hydroxides, alkali metal amides and alkali metal acetylides. These substances are suspended as fine powders in the organic solvents by using efficient mixers. The suspensions can then be injected under pressure into the reactor and it can be ensured by the provision of suitable recirculating equipment that there is no unmixing of the suspension on its way to the injection pump. As shown by Examples 1, 2, 4 and 5, lower alkali metal alkanolates such as sodium methylate and potassium tert-butylate are suitable condensation agents.

In order to avoid the formation of a gas phase, pure acetylene containing no inert gas is preferred. Commercially pure acetylene is generally supplied at a pressure of between 25 and 28 atm. gauge. It is pressured into the reaction vessel at such a rate that acetylene concentrations of more than 100 parts by volume of acetylene per 1 part by volume of reaction mixture do not occur. Generally, depending upon the solubility of the acetylene in the solvent used, a reaction pressure of between 5 and 26 atm. gauge will prevail.

The continuous reaction in accordance with the present invention may for example be carried out using stirred pressure vessels provided with facilities for adequate cooling in the form of internal tube coils or a cooling jacket. Cylindrical stirred autoclaves are particularly well suited, these being equipped with a feed line for the suspension of the basic condensing agent, a further feed line for the carbonyl compound, a pressure injection line for acetylene and a discharge line for the reaction mixture. The feed lines and the discharge line are expediently arranged at opposite ends of the autoclave. At the commencement of the reaction, the stirred reaction vessel is completely filled with solvent in order to drive off the gas phase. Then, the carbonyl compound and the suspension of the basic condensing agent are continuously pumped in in the requisite quantities and pure acetylene is pressured in. The maximum permissible reaction pressure depends upon the solubility of the acetylene in the solvent used. This pressure can be determined by finding the Bunsen coefficient $\alpha$ of the mixture (volumes of gaseous acetylene at 1 atm. abs., dissolved in volumes of reaction liquid).

The reaction temperature is selected in a range extending between 0 and 80° C., preferably between 15 and 65° C. Because the reaction is an exothermic one, the temperature can be maintained within the desired range by cooling.

In the stirred autoclave a homogeneous solution is usually formed and this can be continuously expanded through a pressure relief valve. Accordingly, the autoclave can be connected to a tubular second-stage reaction vessel which need not contain any stirrer.

In this embodiment, it is often possible to substantially reduce the time of dwell in the stirred vessel because complete reaction of the carbonyl compound is obtained in the second-stage reaction vessel anyway.

After discharge from the stirred autoclave and second-stage reaction vessel, and expansion, the unreacted acetylene is obtained in the pure form and can thus be recirculated immediately to the autoclave.

In accordance with the method of the invention, the carbonyl compounds can be converted virtually instantaneously and quantitatively into the corresponding acetylene alcohols. This means that in a pressure vessel of given size it is possible using the continuous method of the invention to produce five to ten times more acetylene alcohol per unit time than can be produced by batchwise methods of operation. Because, through the exclusion of the gas phase, the acetylene concentrations are always optimum, in addition better yields are obtained and basic condensing agent can be economized on.

The method of the invention is suitable for the ethynylation of any aliphatic, aromatic, araliphatic and cycloaliphatic aldehydes and ketones, but its major commercial significance is in relation to aliphatic aldehydes with between 4 and 20 carbon atoms and aliphatic ketones of between 8 and 20 carbon atoms. The preferred basic materials furthermore derive from the R—CHO and R—CO—R' types, in which the R residues are pure hydrocarbons or hydrocarbon residues which have been substituted by alkoxy groups. Where araliphatic, aromatic and cycloaliphatic residues are concerned those with 6-membered rings are preferred.

The reaction heat, too, can be dissipated substantially more easily in continuous operation. In contrast to the methods hitherto known, in which the reaction heat had to be dissipated across the thick-walled pressure vessel using brine cooling, the cooling can be carried out using water in the present method. This is made possible in particular by virtue of the fact that a higher reaction temperature can be used without necessitating a reduction in the quantity of dissolved acetylene.

Acetylene is used in the form of an unmixed gas. The unreacted proportion can be recirculated. The pressure and the temperature in the stirred vessel are maintained within the requisite range by the continuous injection under pressure of pure acetylene and by cooling.

EXAMPLE 1

Ethynylation of geranylacetone

In a stirred vessel which is connected to a centrifugal pump acting as a homogenizer, an approximately 22% suspension of sodium methylate powder in anhydrous tetrahydrofuran is produced.

Of the resultant sodium methylate mash, 90 l. per hour are pumped by means of a piston-type metering pump whose suction valve is installed directly in the circulating system between stirred vessel and homogenizer into a 160-l. cylindrical, horizontally arranged autoclave provided with jacket cooling, the stirrer of which is designed as a cooling coil. The introduction of the sodium methylate mash is effected at one end of the autoclave. At the same time, 60 l. (52 kg.) per hour of geranylacetone are pumped in at the same end and pure acetylene is injected under pressure through a feed line, again at the same end. The acetylene supply is regulated. About 21 m.³ (S.T.P.) of acetylene are supplied per hour. The autoclave is operated at such a pressure, in the present case at 17 atm. gauge (discharge valve controlled by autoclave pressure), that when the autoclave temperature is maintained at between 40 and 45° C. and the composition of the feed is maintained, no supersaturation with acetylene can take place. In no circumstances may an acetylene concentration in excess of 100 l. per liter of reaction mixture be allowed to develop.

This discharge valve is located at the other end of the autoclave, that is to say the end opposite to that at which the inlets for the sodium methylate mash, the geranyl acetone and the acetylene are located. Through this pressure relief valve, the reaction mixture is expanded into a hydrolyzing vessel where, by treating it with water, an organic layer of dehydronerolidol in tetrahydrofuran and an aqueous soda solution layer, are produced.

The two layers are separated in a separator vessel and the organic layer is neutralized by the addition of formic acid. The dissolved acetylene which is liberated with expansion and hydrolysis is supplied to a gasometer and used again for reaction. The organic layer is distilled after neutralizing, at atmospheric pressure or under a weak vacuum, the tetrahydrofuran being recovered. The dehydronerolidol is left behind in the distillation residue. In this way, about 50 to 52 kg. of dehydronerolidol are obtained per hour. The product can be employed without any further purifying operations in the manufacture of nerolidol.

The molar ratio of sodium methylate to geranylacetone is advantageously 1.4:1. If the sodium methylate proportion is reduced, then the residual ketone content rises and less dehydronerolidol is formed.

The residence time is about 60 mins. By using a second-stage reaction vessel in which the reaction mixture can finish reacting for another 15 mins. under full acetylene pressure, the conversion efficiency can be improved by a few more percent.

Without any second-stage reaction vessel, the conversion efficiency as well as the yield in terms of dehydronerolidol is about 88 to 94%.

If, instead of the sodium methylate mash, an approximately 15% suspension of sodium acetylide in tetrahydrofuran is used, then under conditions which are otherwise the same, a conversion efficiency of between 96 and 99% is obtained and, accordingly, a yield of 55 to 56 kg. of dehydronerolidol per hour.

If, instead of sodium methylate, equivalent quantities of potassium hydroxide powder are suspended in tetrahydrofuran, then the reaction temperature must be maintained at between +5 and +10° C. since at higher temperatures the formation of acetylene glycols is promoted, with a consequent reduction in the yield in terms of dehydronerolidol.

At the same time, the low reaction temperatures entail a longer residence time in the reaction vessel, this being dictated by the requirement to completely react the geranyl acetone.

Accordingly, only 45 l. per hour of the 25% potassium hydroxide tetrahydrofuran mash and 30 l. per hour of geranyl acetone are pumped into the autoclave and the reaction temperature is maintained at +10° C. The residence time then is about 2 hours. The dehydronerolidol yield is 26 to 28 kg./hour.

EXAMPLE 2

Ethynylation of hexahydrofarnesylacetone

In the manner described in Example 1, 90 l. of sodium methylate mash, prepared from 22 kg. of sodium methylate and tetrahydrofuran, are pumped into the stirred autoclave per hour. At the same time, 82 kg. of hexahydrofarnesylacetone plus 17 m.$^3$ (S.T.P.) of acetylene are supplied to the autoclave hourly. At a reaction temperature of 35° C. and a pressure of 18 atm. gauge, a yield of 81.5 kg./hour of dehydroisophytol is obtained. If the 90 l./hour of sodium methylate mash are replaced by a suspension of sodium acetylide in tetrahydrofuran, and if 90 l./hour of sodium acetylide mash containing 7.5 kg. of sodium acetylide (produced from 8.4 kg. of sodium) are pumped into the autoclave simultaneously with 82 kg./hour of hexahydrofarnesyl acetone, then at a reaction temperature of 40° C. and at a pressure of 18.5 atm. gauge 84 kg./hour of dehydroisophytol are obtained.

EXAMPLE 3

Ethynylation of β-ionone

In the manner described in Example 1, 60 l./hour of sodium acetylide mash containing 6.35 kg. of sodium acetylide in tetrahydrofuran, and 17.2 kg. of β-ionone as well as approximately 12 m.$^3$ (S.T.P.) of acetylene, are pumped into the autoclave and the reaction temperature is maintained at between 20 and 25° C., the pressure at 14 atm. gauge. After hydrolysis and distilling off of the tetrahydrofuran, an hourly yield of 17.5 kg. of acetylene ionol is obtained.

EXAMPLE 4

Ethynylation of methylglyoxaldimethylacetal

In the manner described in Example 1, 90 l./hour of a suspension consisting of 79 l. of tetrahydrofuran and 16 kg. of sodium hydroxide, together with 37 kg./hour of methylglyoxaldimethylacetal plus 17 m.$^3$ (S.T.P.) hour of acetylene, are pumped into the autoclave. The reaction temperature is maintained at between 30 and 35° C. and the pressure at 5 to 26 atm. gauge, giving an hourly yield of 37 kg. of ethynylated methylglyoxaldimethylacetal. If the sodium hydroxide mash is replaced by a sodium methylate mash (made up of 24 kg. of sodium methylate powder and 79 l. of tetrahydrofuran) then approximately the same yield figures are obtained.

EXAMPLE 5

Ethynylation of butylaldehyde

In a similar manner to that described in Example 1, 90 l. of a sodium acetylide mash containing 10 kg. of sodium acetylide suspended in tetrahydrofuran are pumped hourly into the stirred autoclave. At the same time, 15 kg./hour of anhydrous butylaldehyde plus 20 m.$^3$ (S.T.P.)/hour of acetylene are also pumped in. At a reaction temperature of 30° C. and a pressure of 14 atm. gauge, an hourly yield of 16.5 kg. of hexyn-1-ol-(3) is obtained.

If potassium tert-butylate is used instead of sodium acetylide or sodium methylate, then for example with 0.7 mole of potassium tert-butylate 2 moles of butylaldehyde can be converted with a 65% yield ratio into hexyn-1-ol-(3). The unreacted butyraldehyde cannot be recovered.

To this end, at a reaction temperature of 20° C., 45 l./hour of a suspension of 10 kg. of potassium tertiary butylate in tetrahydrofuran are pumped into the autoclave simultaneously with 11 kg./hour of butyraldehyde. An hourly yield of 10 kg. of hexynol and about 1.1 to 1.3 kg. of residue, consisting of condensation products of the butyraldehyde, is obtained.

We claim:

1. A process for the continuous production of an acetylene alcohol by reaction of a ketone or aldehyde of the formulae R—CHO and R—CO—R$^1$ wherein the R residues represent hydrocarbon groups or alkoxy-substituted hydrocarbon groups with acetylene in an organic solvent in the presence of a suspended basic condensing agent and acetylene at elevated pressure, wherein a suspension of a basic condensing agent selected from the group consisting of alkali metal lower alkanolates, alkali metal hydroxides, alkali metal amides and alkali metal acetylides in said organic solvent consisting of tetrahydrofuran is injected into the reaction chamber continuously and simultaneously with said ketone or aldehyde and pure gaseous acetylene, a pressure in the range between 5 and 26 atm. gauge and a temperature of from 0 to 80° C. is maintained in the reaction chamber and the reaction mixture is continuously stirred and discharged therefrom so that no gas phase can develop in the reaction chamber, the basic condensing agent being employed in at least 0.6 times the molar quantity referred to that of the carbonyl compound.

2. A process as claimed in claim 1 in which the basic condensing agent is employed in an amount of 0.9 to 2.0 moles per mole of carbonyl compound.

3. A process as claimed in claim 1 wherein said basic condensing agent is sodium hydroxide, sodium acetylide, or sodium methoxide.

4. A process as claimed in claim 1 carried out at a temperature of 15 to 65° C.

5. A process as claimed in claim 1 wherein an aliphatic aldehyde having 4 to 20 carbon atoms is reacted with acetylene.

6. A process as claimed in claim 1 wherein an aliphatic ketone having 8 to 20 carbon atoms is reacted with acetylene.

7. A process as claimed in claim 1 wherein geranylacetone, hexahydrofarnesylacetone or β-ionone is used.

8. A process as claimed in claim 1 wherein methylglyoxaldimethylacetal is reacted with acetylene.

References Cited

UNITED STATES PATENTS

| | | | |
|---|---|---|---|
| 3,006,968 | 10/1961 | Pasedach et al. | 260—617 A |
| 3,496,240 | 2/1970 | Sturzenegger | 260—638 Y |
| 2,919,281 | 12/1959 | Chodroff et al. | 260—638 Y |
| 2,987,557 | 6/1961 | Happel et al. | 260—638 Y |
| 3,082,260 | 3/1963 | Tedeschi et al. | 260—638 Y |
| 2,973,390 | 2/1961 | Nedwick et al. | 260—638 Y |

FOREIGN PATENTS

| | | | |
|---|---|---|---|
| 649,641 | 1/1951 | Great Britain | 260—638 Y |
| 813,490 | 5/1959 | Great Britain | 260—638 Y |
| 627,474 | 8/1949 | Great Britain | 260—638 Y |
| 620,298 | 3/1949 | Great Britain | 260—638 Y |

BERNARD HELFIN, Primary Examiner

J. E. EVANS, Assistant Examiner

U.S. Cl. X.R.

260—611A, 615 R, 617 E, 618 E, 631 R, 631.5, 635 Y, 638 Y